Figure 4:
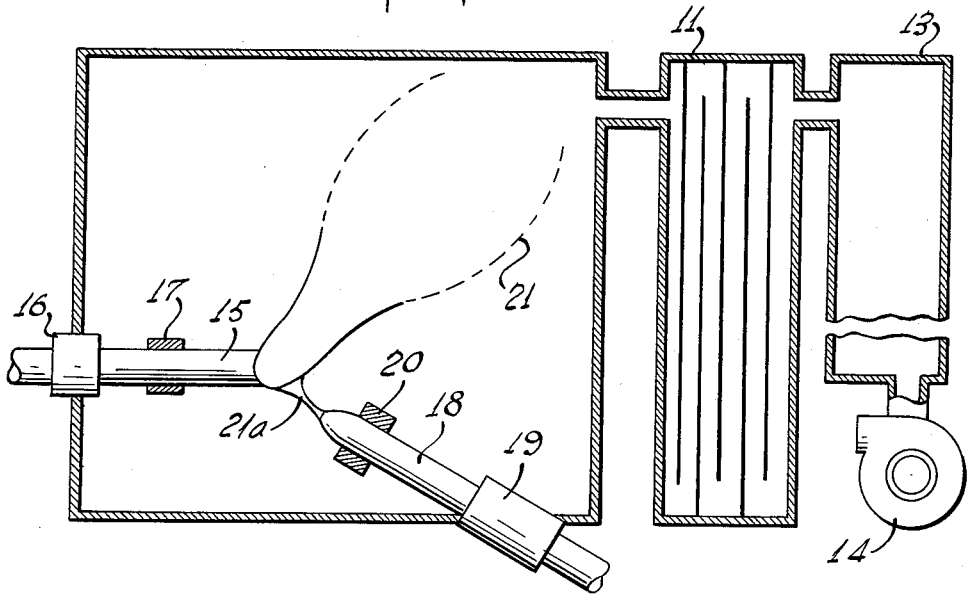

April 11, 1961 C. SHEER ET AL 2,979,449
CARBOTHERMIC REDUCTION OF METAL OXIDES
Filed Dec. 5, 1958 3 Sheets-Sheet 1
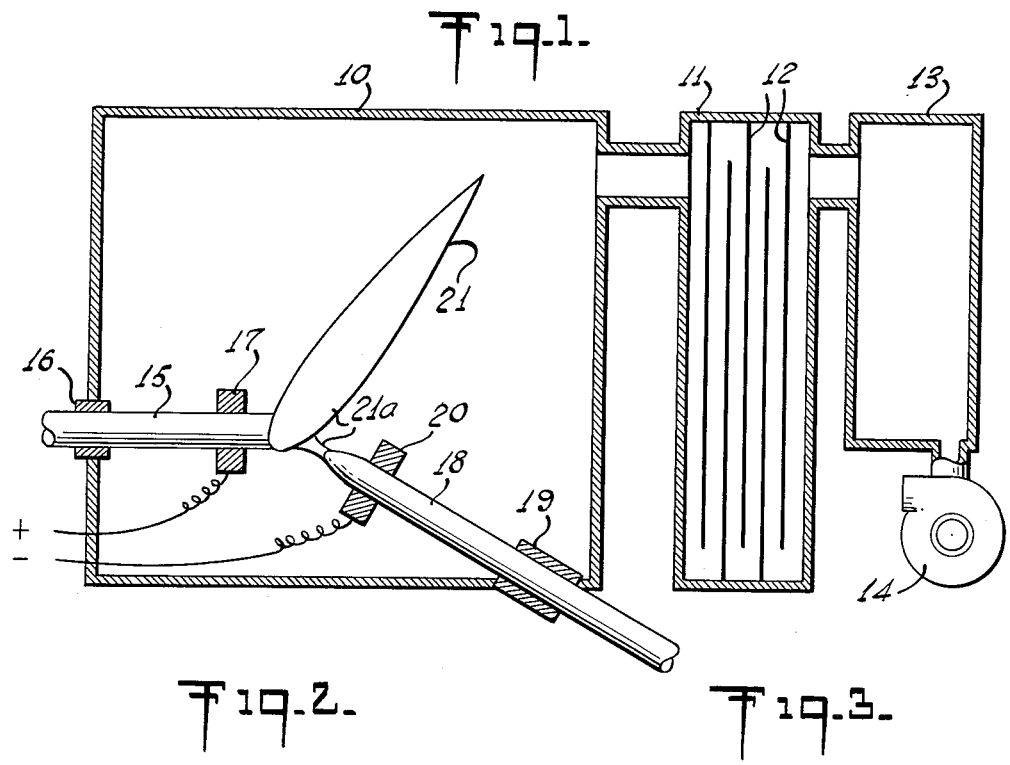
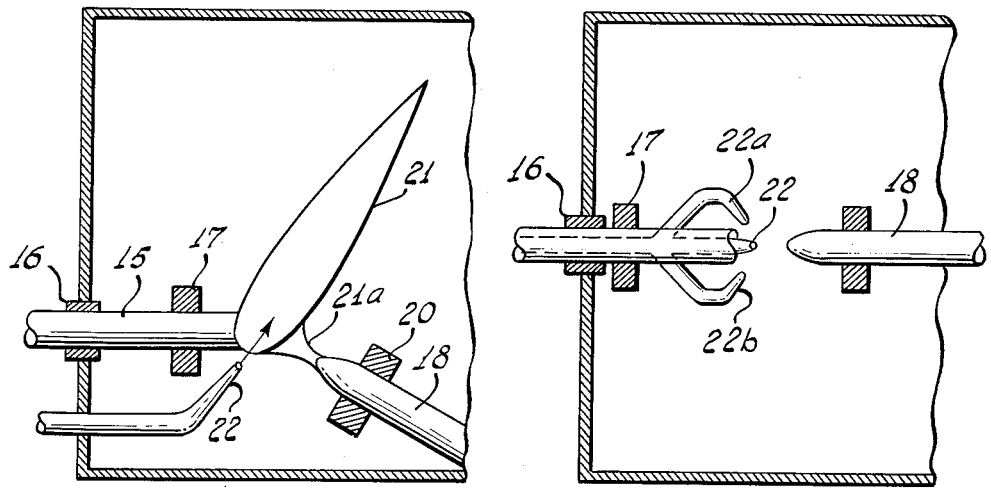
INVENTORS
CHARLES SHEER
SAMUEL KORMAN
BY
ATTORNEY April 11, 1961 C. SHEER ET AL 2,979,449
CARBOTHERMIC REDUCTION OF METAL OXIDES
Filed Dec. 5, 1958 3 Sheets-Sheet 2

INVENTORS
CHARLES SHEER
SAMUEL KORMAN
BY
ATTORNEY

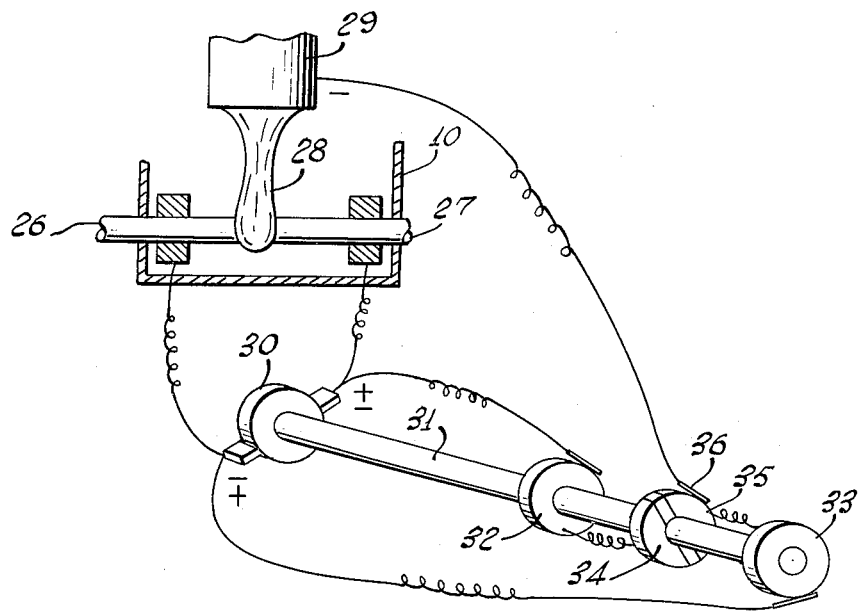

United States Patent Office 2,979,449
Patented Apr. 11, 1961

2,979,449

CARBOTHERMIC REDUCTION OF METAL OXIDES

Charles Sheer, Teaneck, N.J., and Samuel Korman, Cedarhurst, N.Y., assignors to Sheer-Korman Associates Inc., New York, N.Y., a corporation of Delaware Filed Dec. 5, 1958, Ser. No. 778,545

3 Claims. (Cl. 204—164)

This invention relates to a new and improved process of reducing elements from their compounds.

This case is a continuation-in-part and consolidation of our former cases Ser. Nos. 424,145, 560,703, and 395,994, which applications are accordingly abandoned.

In our Patent 2,616,761 we have shown that certain metals could be separated from their refractory compounds in the plasma of a high erosion arc, or hierarc, as it has come to be called.

The hierarc is a new tool to chemistry, involving such an intense concentration of energy in the materials that its chemical and physical effects are completely unpredictable. Not only are the feed materials raised to temperatures of the order of 8000° C., but they are also subjected to an unusually high degree of atomic electrification or ionization. Thus the hierarc provides an unique reaction medium never before used to promote chemical and physical changes in materials.

It could be foreseen that compounds and even elements would be broken down by this medium, but there was no way to predict what would happen as a result of the subsequent cooling. So far as we had discovered at the time Patent 2,616,761 was filed, it was believed that an atmosphere of chlorine was important to secure the desired elements in useful form, when they emerged from the cooler regions of the plasma.

In the course of very extensive further work it has been discovered that, although the components of all chemical compounds become completely dissociated and completely ionized, they can by proper procedure be condensed and separately recovered as metals without using chlorine.

This momentous step formed the basis of another application, Ser. No. 395,994, Reducing Metals From Their Oxides, filed December 3, 1953, which will here be referred to as the parent application. That application was stated to apply to "metals such as beryllium, aluminum, manganese, titanium, zirconium and silicon," and the specification gave these as illustrative only of the large group for which the direct reduction of the oxides by conventional means was impossible or uneconomical. By its wording it showed that this list was illustrative and not limiting.

In the practical development of the process it became desirable to use it for obtaining boron from its compounds, particularly oxygenated compounds, which, as recited in the parent case, do not readily yield to conventional methods of reduction.

Because of the importance of this phase of the process, a special application was filed to recite these boron compounds and the recovery of boron therefrom. That application bore Serial No. 424,145, Process for Producing Boron, filed April 19, 1954.

That application was filed as a division of the parent case, and will be referred to as the second case. The process was inherently the same as in the parent case, Ser. No. 395,994, applied to a special substance.

In the course of the work on boron, specific procedures in the technique of anode manufacture were found desirable, and this new technique facilitated the operation with ores of that type.

A new application, Serial No. 560,603 was filed as a substitute for the second case, and this we will call the third case. That case was filed for the purpose of including the new anode fabrication technique.

As will be understood, the reactions with which this process is concerned occur at temperatures so high that the ordinary affinities and classifications of elements do not apply. This process is known to be applicable to beryllium, aluminum, magnesium, calcium, barium, manganese, titanium, zirconium, silicon and boron and alloys thereof. We shall therefore refer to these metals as examples of the susceptible class by the phrase "of the metals stated." It seems probable however that there are other metals that will be found to fall within that class and be subject to the same treatment with the same end result. This process is applicable to naturally occurring ores of these metals, and also to other materials containing these metals in oxidized form, such as slags or chemically extracted oxides.

The reaction of this process is to be distinguished from those low temperature reactions heretofore known, as for example the Hansgirg process, in accordance with which magnesium oxide is dropped into a bed of moderately heated coke (in solid form) and in which the mixture is heated by an ordinary electric arc to reduce the oxide by the heated coke and produce magnesium vapor. In such process, reacting materials are heated to a temperature of no more than 2800° C. at the most. With such an arc furnace and at such temperatures, both of the reacting ingredients are in solid phase, and by the very nature of the process the reaction rate and efficiency are slow and the yield is limited. The Hansgirg process is applicable only to magnesium as far as disclosed.

In accordance with this new process, using magnesium as an example, we convert the raw material to a highly energized jet of elemental vapors consisting initially of carbon, magnesium and oxygen, all of which are primarily in the form of monatomic gases. The carbon is in sufficient quantity to fix all the oxygen as CO, which is the most stable molecule species at very high temperatures. Very shortly after issuing from the electrode, the vapors consist of a mixture of CO gas and magnesium vapor. We then condense the metal. The carbon in the anode serves the double purpose of making the anode conducting, and, after vaporization, of fixing the oxygen contained in the raw material. Since the reacting vapors are at such a high temperature (circa 8,000° to 10,000° C.), the reaction goes to completion in a small fraction of a second (circa $\frac{1}{1000}$ of a second)—and the reduction is virtually quantitative.

We have discovered that the hierarc can be operated so as to produce a well-defined, uni-directional cylindrical flame of limited dimensions. This is done by varying the arc gap distance and the angle between the electrodes until the flame stabilizes, the exact configuration depending on the material of the anode, the arc current, the electrode diameter and the ambient pressure. However, for a given set of operating parameters, it is always possible to find a stable position easily by rapid trial and error manipulation of arc gap length and electrode angle.

The achievement of a stable plasma jet is a tremendous advantage since it provides a self-contained reaction zone, characterized by ultra-high temperatures, which is constrained in free space to a specific geometry, whether the surrounding atmosphere is at high pressure or at high vacuum. Thus the annoying and costly problem of maintaining furnace walls from which conventional processes (such as the Hansgirg process) suffer, is completely eliminated.

The stable configuration of a long, cylindrical high speed jet is also ideal for effective quenching of the reaction products, as for example by injecting cold gases to chill and dilute the vapors. Instead of large masses of slow moving products characteristic of conventional processes, we have only a very small volume of gas to quench, even though owing to the high speed flow we can achieve superior material through-put rates for a given equipment size. Thus we can more effectively prevent back reaction and achieve nearly quantitative yields with high efficiency.

The movements of free electrons and of the ionized atoms in the tail flame has been the subject of very extensive study, and the valences and chemical affinities of the atomic fragments make the results unpredictable, since the same substance at different positions in the arc stream undergoes changes in its effective valence and its chemical affinities. Therefore we have found, for example, that different substances have different optimum quench positions.

In the description herein given we have endeavored to express the ultimate results of the reactions here involved in terms of conventional chemistry, although the pathway through which those results were achieved is quite different from that which the conventional concepts of chemistry suggest.

The conduct of the process of this invention follows in general the procedure of our previous patent, so far as the establishment of the hierarc is concerned. In accordance therewith, electrodes are fabricated for the hierarc, comprising the oxide to be reduced, and carbon. In our previous patent the percentage of carbon in the anode was determined by the amounts required to make the electrode sufficiently conducting to the currents involved, and chlorine was required to assist in the reduction and to prevent back reaction. In the present case the carbon in the anode is that quantity which is just sufficient to convert all of the oxygen of the compounds treated to CO.

In conducting this process the anode manufacture will differ from our former patents in that the percent of carbon employed will be of stoichemical proportions to reduce the oxygen of the ore to CO.

Thus the proper proportions of ore and carbon may be formed into anode shape with a suitable binder such as we formerly described and then baked to convert the carbon into a continuous matrix containing the ore.

For refractory ores the procedure described in our former patents will be found satisfactory.

Where less refractory ores are to be treated, however, the baking temperature as it progresses must be kept low enough to prevent the ore from melting out of the anode before the baking is complete. With such ores, if such difficulty is encountered, it may be found helpful to enclose the green electrode in a thin carbon shell, to hold the molten ore in place while the electrode containing the ore is raised to the carbon pyrolizing temperature after which it will be held in the carbon matrix and may be used in the process directly.

The hierarc may be operated by direct current, or in a system where proper polarity is maintained, by an alternating current, such that each electrode serves as anode in its turn.

Figure 5:
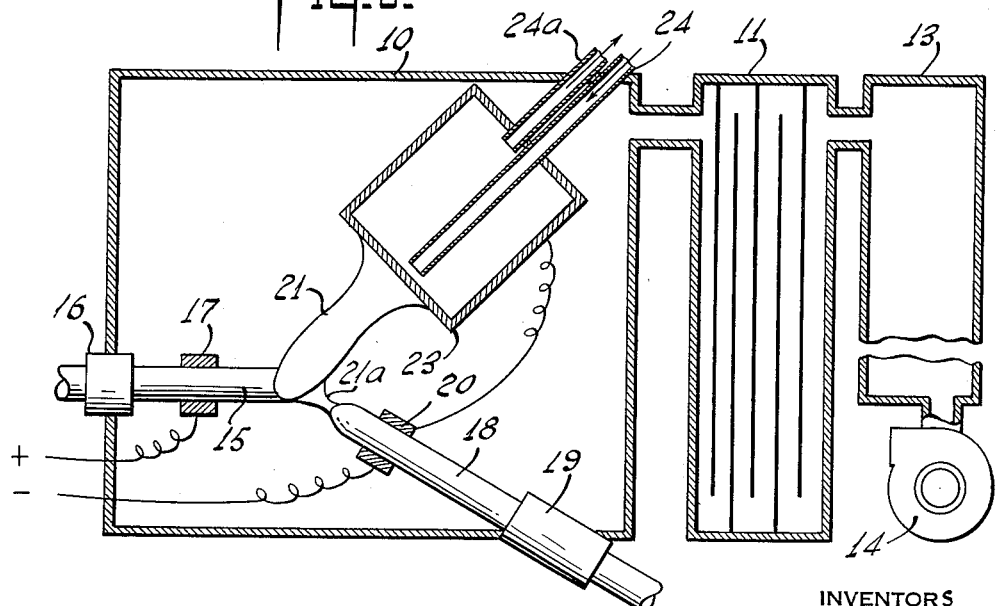

The process herein described may be better understood by reference to the accompanying drawing, in which Figure 1 is an elevation diagram of an apparatus by which one form of this process may be carried out; Figure 2 is a fragmentary elevation of a diagrammatic apparatus for modification of the process; Figure 3 is a top plan diagram of the embodiment of Figure 2 with the anode electrode broken away; Figure 4 is an elevation diagram for a modified form of the process; Figure 5 is an elevation diagram of another modification; and Figure 6 is a modification designed to utilize A.C. current.

Referring now to Figure 1, the numeral 10 represents a chamber in which the arc is conducted, and within which the atmosphere may be controlled, and from which the metal is recovered. As shown here diagrammatically, the chamber is connected to a cooling chamber 11, having cooling baffles 12 and thence to a filter 13, through which the product gases are drawn by an exhaust apparatus 14. These are shown to indicate any standard or appropriate method of collecting the metallic dust from the arc chamber. This chamber 10 in Figure 1 is filled with inert gas, such as helium, and the access of atmospheric air to the metal is prevented throughout the apparatus, since any oxidation, or nitridation of the metal powder is detrimental to the product.

Within the chamber 10 is anode 15, shown as carried by bushings 16 through the chamber walls. In practice there is provided a feed mechanism, not shown here, capable of feeding the anode at the high rate required for a high erosion arc. The numeral 17 is a brush for leading the current as near to the anode face as practical, since the high current consumption makes this desirable.

A cathode electrode 18 is shown extending through a bushing 19 in the bottom of the chamber 10, also having a brush 20 near the end and also provided with a feed mechanism, not shown.

The anode is composed, as has been above mentioned, of a mixture of carbon and the oxide of the metal, baked together. In the case of beryllium, the carbon will be about one-half the weight of the oxide; with other oxides, the carbon will be in sufficient quantity to consume the oxygen of the ore and to make the electrode conducting.

When the material is of relatively low melting point, such as borax, the anode may comprise a fused mass of the boron-containing material, or carbon mixed with boron material, within a carbon shell. The shell is unnecessary if the baking process is conducted at a temperature below the fusion temperature of the ore.

As an example, in the treatment of the beryllium oxide, using an anode of two inches in diameter, the current values will be about 750 amperes or more, requiring about 80 volts. When these current values are sent through the arc, there shoots off from the anode a highly luminous flame 21, comprising vaporized material of the anode which bends away from the cathode, but a smaller stream 21a of ionized vapor extends from the cathode to meet the flame near its base. These two phenomena are characteristic of the high erosion arc, and it is this high velocity jet of vapor comprising the anode flame on which the process depends.

The gases, as they leave the anode, are in the range of 8000° and 10,000° C., and are therefore all in some ionized form, being thus a mixture of ionized vapors of metal, carbon and oxygen.

The current required for the operation of the arc is most readily determined by inspection of the operation, since the tail flame emerging from the anode shooting away from and beyond the cathode is itself the surest indication that the process is properly operated. This is a very convenient way of measuring the current, because with different sized electrodes the current density per square inch is not the same. As illustrative, however, we may mention that with a direct current arc, using an anode 2 inches in diameter, the current density should exceed 200 amperes per square inch of electrode cross sectional area, or about 650 amperes. When an A.C. arc is used the voltage range is 70 volts to 150 volts A.C.

The exact form of the matter within the arc flame, particularly in the hotter portions of these ionized gases, is the subject matter of extensive research at the present time. It is known, however, that at that point no normal compounds exist and no normal chemical affinities or valences obtain. As the ionized gases cool, normal chemical affinities gradually reassert themselves, although in what order they come into play is not yet known. It is also not yet known how far the rate of cooling effects the reaction which occurs as the gases cool. It has, however, been found that if a proper rate of cooling is established the metal or metalloid values may be recovered in powdered form while the carbon itself seizes all of the oxygen.

The following explanation conforms to the observed phenomena and seems to be the most probable: If the gases are rapidly cooled, it is the nascent carbon which first unites with the freed oxygen until it reaches the compound CO. The quantity of carbon is therefore chosen sufficient to absorb all the oxygen, perhaps while the metals are still in vapor or ionized vapor form. As the metal vapors cool further in the CO atmosphere, the individual metals condense out.

In accordance with this process therefore, the rate of cooling is maintained high enough to precipitate all of the metals still unoxidized.

The product gases passing in the flame move at a high velocity. In accordance with one embodiment of this invention, this fact is relied upon to cool the product gases down to a temperature below that required to produce back reaction, before the back reaction can take place.

In the embodiment of Figure 1 the arc chamber is filled with an atmosphere of inert gas, such as helium, and the vapors are cooled quickly, below the critical temperature, by radiation into the inert gas. The metal thus precipitated appears as a fume, part of which may settle in the arc chamber from which it may be recovered, but the bulk of which will pass out into the cooling chamber and the filter, where it is recovered.

The prevention of the back reaction, and hence the completeness of the metal recovery as described above, may be improved by injecting into the tail flame a cooling jet of inert gas, preferably at the velocity substantially greater than that of the jet, to hasten the cooling. Such a structure is illustrated in Figures 2 and 3. Here there is provided a jet 22 at the base of the tail flame, or as shown in Figure 3, a plurality of jets 22, 22a and 22b, shooting into the base of the tail flame from three sides, to assist in the cooling action. The apparatus is otherwise as shown in Figure 1.

Another form of the process is shown in Figure 4. Here the physical apparatus is substantially the same as in Figure 1, except that the chamber is maintained at a very low pressure, such as that commonly called a "vacuum." In this embodiment the tail flame expands in the vacuum and the vapor disseminates rapidly over a much larger volume of the chamber. Thus, the liability to back reaction is greatly reduced because of this attenuation, while at the same time the dissipation of heat is facilitated.

In the embodiment of the invention shown in Figure 5 the arc and chamber apparatus are as has been previously described, but in this case there is interposed into the path of the gases from the tail flame a cooled surface against which the gases and metal vapor impinge, while they are above the back reaction temperature. In this manner the metal may be recovered upon the cooled surface 23 and may be removed therefrom by stripping or otherwise. This Figure 5 also includes provision for the cooling chamber 11 and the filter 13, should that be necessary to collect such fume as may not be deposited upon the cooled surface 23.

In this embodiment, the cooled surface 23 is diagrammatically represented by an inflow of cooling liquid through tubes 24 and 25 to absorb the heat resulting from the impingement of the hot gases. This representation is diagrammatic only and in commercial operation it would be found desirable to maintain the cooled surface in rotation, so that the jet does not impinge too long upon one spot. In such case, the tubes 24 and 24a may be made concentric. Such proceeding is well known in industry and need not here be illustrated.

The construction shown in Figure 5 may be used with an atmosphere of a neutral gas, but preferably, it is desirable that the pressure of the gas be low.

The apparatus has heretofore been illustrated as employing a direct current arc, although, as pointed out, there is no essential difference between the D.C. and A.C. arcs, and the A.C. arc may be used in any of the embodiments shown.

Figure 6 shows such an A.C. arc specifically, as applied to the construction similar to Figure 5. In this case both the electrodes 26 and 27 contain the same material and each in turn serves as an anode and from them issues the flame 28 impinging upon the cooled surface 29 substantially as has been described.

The product gases are highly ionized, and on this account it may be desirable to impose upon the cooled surface a cathode potential, which may be the same potential as the cathode itself. As shown in Figure 5, the cooled surface is connected to the cathode by a wire 25. When the A.C. current arc is used, as in Figure 6, each of the electrodes become a cathode in succession, as the current reverses. To this end there is provided means to connect the cooled surface with the particular electrode which is serving as a cathode in the instant. As diagrammatically shown a motor 30 drives a shaft 31 carrying slip rings 32 and 33 connected to commutator segments 34 and 35 and a brush 36 bearing upon the commutator is connected to the cooled surface by a wire 37. The brush being so set, relative to the commutator, that the brush is maintained negative.

With this construction it will be clear that the cooled surface, being maintained negative, will attract the positive ions of the metal, and discharge them so that the metal can accumulate upon the cooled surface as long as desirable without being repelled by an accumulation of positive charge.

What is claimed:

1. The process of reducing the oxidized ores of any of the group of elements consisting of beryllium, aluminum, magnesium, calcium, barium, manganese, titanium, zirconium, silicon and boron, which comprises maintaining a high erosion arc with an anode comprising the ore to be reduced, mixed with a stoichiometrical quantity of carbon, whereby the contents of the anode are reduced to ionized elemental form, and whereby as the vapors start to cool, the carbon vapor included in the ionized vapors will fix the oxygen vapor, and then rapidly cooling the product gases below the temperature at which a back reaction between the metal and carbon monoxide can take place, and then removing the condensed metal.

2. A process according to claim 1 in which the cooling is done by injecting into the stream of product gases a cool neutral gas.

3. A process according to claim 2 in which the gases are injected at substantially greater velocity of movement and substantial co-directional width with the stream of product gases.

References Cited in the file of this patent

UNITED STATES PATENTS

| | | |
|---|---|---|
| 916,793 | Seward et al. | Mar. 30, 1909 |
| 1,061,256 | Allen et al. | May 13, 1913 |
| 2,616,843 | Sheer et al. | Nov. 4, 1952 |